（12）United States Patent
Ovshinsky et al.

(10) Patent No.: US 7,491,448 B2
(45) Date of Patent: Feb. 17, 2009

(54) RETICULATED FOAM-LIKE STRUCTURE FORMED OF NANO-SCALE PARTICULATE

(75) Inventors: Stanford R. Ovshinsky, Bloomfield Hills, MI (US); Marshall D. Muller, Farmington, MI (US); Lin R. Higley, Troy, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 375 days.

(21) Appl. No.: 11/325,981

(22) Filed: Jan. 5, 2006

(65) Prior Publication Data

US 2007/0151456 A1 Jul. 5, 2007

(51) Int. Cl.
*B01J 20/06* (2006.01)
(52) U.S. Cl. ............... 428/566; 428/613; 977/777; 977/811; 429/218.2
(58) Field of Classification Search ............... 96/108; 429/218.2; 206/0.7; 423/248, 648.1; 428/546, 428/566, 613; 977/700, 775, 777, 810, 811, 977/962
See application file for complete search history.

(56) References Cited

U.S. PATENT DOCUMENTS

| | | | | |
|---|---|---|---|---|
| 5,599,456 A * | 2/1997 | Fanning | ................. | 210/668 |
| 6,015,041 A * | 1/2000 | Heung | ................... | 206/70 |
| 6,051,117 A * | 4/2000 | Novak et al. | ................ | 204/252 |
| 6,589,312 B1 * | 7/2003 | Snow et al. | ................... | 75/255 |
| 7,338,549 B2 * | 3/2008 | Bulow et al. | ................... | 95/96 |
| 2002/0197178 A1 * | 12/2002 | Yan | ................... | 419/6 |
| 2004/0089151 A1 * | 5/2004 | Wang et al. | ................. | 95/90 |
| 2004/0137209 A1 * | 7/2004 | Zeller et al. | ............. | 428/304.4 |
| 2004/0244590 A1 * | 12/2004 | Ma et al. | ................. | 96/11 |
| 2005/0079374 A1 * | 4/2005 | Asai | ........................ | 428/613 |

OTHER PUBLICATIONS

Lee, Jinwoo et al, "Low-cost and facile synthesis of mesocellular carbon foams", Chem. Commn. 2674-2675, The Royal Society of Chemistry, 2002.*

* cited by examiner

*Primary Examiner*—Frank M Lawrence
(74) *Attorney, Agent, or Firm*—David W. Schumaker (57) ABSTRACT

A nano-particulate reticulated foam-like structure, which includes particles having a size of 10-200 nanometers. The particles are joined together to form a reticulated foam-like structure. The reticulated foam-like structure is similar to the structure of carbon nano-foam. The nano-particulate reticulated foam-like structure may comprise a metal, such as a hydrogen storage ahoy, either a gas-phase thermal or an electrochemical hydrogen storage alloy. The nano-particulate reticulated foam-like structure may alternatively comprise a hydroxide such as nickel hydroxide or manganese hydroxide or an oxide, such as a silver oxide or a copper oxide. When the nano-particulate reticulated foam-like structure is a hydrogen storage alloy, the material exhibits substantial immunity to hydrogen cycling decrepitation and an increase in the reversible hydrogen storage capacity by reduction of trapped hydrogen by at least 10% as compared to the same alloy in bulk form.

3 Claims, 6 Drawing Sheets

RETICULATED FOAM-LIKE STRUCTURE FORMED OF NANO-SCALE PARTICULATE

FIELD OF THE INVENTION

The present invention relates to a unique and universally useful reticulated foam-like structure formed of nano-scale particulate. More specifically it relates to useful materials formed having the reticulated foam-like structure, such as catalysts, and materials for hydrogen storage, battery electrodes and fuel cell electrodes. The present reticulated foam-like structure, which is similar to carbon nano-foam but is formed from interlinked nano-scale particulate which may be formed from a metallic alloy, gives materials with not only uniquely high surface area, but due to the multiple degrees of freedom (such as topological, compositional, translational, and positional freedom) the materials exhibit superior catalytic properties and hydrogen storage properties with fast kinetics and useful plateau pressures at ambient temperatures as well as unusual bonding and anti-bonding orbitals which lend themselves to atomic and orbital design. The nano-scale sized particles, which are material systems in themselves, in combination with the reticulated foam-like structure they form allow for unique new opportunities in materials.

BACKGROUND OF THE INVENTION

One of the major problems with conventional hydrogen storage alloys is that upon cycling, the particles of the powdered hydrogen storage alloy tend to break apart upon absorption/desorption cycling. This breaking up or decrepitation can cause problems in the use of hydrogen storage alloys. Previous patents and applications have addressed this problem by container design, compartmentalization of the interior of the containers and internal thermal management systems. Another problem involves the irreversibility of some hydrogen storage in alloys. The present invention minimizes decrepitation by using the nano foam-like structure, which allows for a great reduction in pressure containment requirements and weight of the storage vessel holding the hydrogen storage material. Importantly the present invention does this using materials having proven hydrogen storage capabilities in a nano foam-like structure which gives extra degrees of freedom to gain more hydrogen storage sites, reversibly or otherwise. The present invention also increases the reversibility of hydrogen storage in some alloys. It does so via a unique reticulated foam-like structure formed of nano-scale particulate which solves kinetic issues, storage capacity issues, and cycle-life issues of gas phase hydrogen storage materials. The nano-scale foam has a structural integrity of their own and do not need a substrate to support them. This means that there can be two or three dimensionality of materials that are put into play which increases the number of available hydrogen sites (although substrates can be utilized which have their own wave functions and interact with the wave functions of the elements of the nano-foam). It should be noted that the increased catalytic activity of the present material, due not only to increased surface sites but also to their associated chemistry, leads to improved capacity and kinetics. The present reticulated foam-like structure is also useful beyond just hydrogen storage materials and can improve battery and fuel cell materials (both positive and negative electrodes), as well as making outstanding multi-functional catalytic materials.

The reticulated foam-like structure is fractal in nature and when purposefully broken up into smaller chunks, the nano-scale structure will not fracture. Thus the fractal structure is preserved. The surface area of the reticulated foam-like structure is as great as that of carbon nano-foam. Having fractal configurations the reticulated foam-like structure does not pack together the same as simple particles would.

Hydrogen for use in fuel cells and as a fuel in internal combustion engines is rapidly taking its place as the next major evolution in energy usage. Unfortunately, conventional means of safely and usefully storing hydrogen reversibly are currently very difficult and expensive. Such fuels are now stored in pressurized tanks or liquid form. We have chosen the solid state storage of hydrogen in hydride storage systems. Hydride storage is far safer than compressed hydrogen gas or liquid storage, and safer even than gasoline on an equivalent-energy basis.

In usage, hydrides have weight penalties versus compressed hydrogen. Additionally, the space limitations on motor vehicles require storage to be close to passengers, compounding such safety concerns. These storage limitations penalize not just on-board vehicle storage and vehicle range, but also the capacity for overall transportation and distribution of hydrogen versus gasoline or other existing fuels, and its storage prior to use. These limitations in turn limit where, how efficiently, and how cleanly hydrogen can be produced. For example, hydrogen generation onboard vehicles from methanol or gasoline reformers cuts total emissions only 7-35%, while steam reforming at service stations would reduce emissions by 40%, and remote generation would reduce emissions by 60-70%, given a practical and economical storage method. A better method of both on-board storing, and transporting and distributing, of hydrogen, including pure hydrogen fuel cell vehicles would have a significant and broad positive impact on this emerging new industry. Thus our material inventions in this area have been able to solve capacity, kinetics and lifetime issues of storage of hydrogen in solid state, but also they have enabled the solutions that are capable of solving the infrastructure problem since they can be transported by ordinary means and the hydrogen can be generated by renewable energy resources such as solar energy captured by triple junction photovoltaic devices, or even using conventional non-renewable sources of hydrogen of any kind.

The main problems of hydrogen fueled vehicles which use conventional high pressure storage hydrogen are vehicle range, safety, and hydrogen fuel availability. These problems are all in turn aspects of the problem of hydrogen storage. A hydrogen fueled vehicle system may achieve the same range as a gasoline ICE (a usual target being 380 miles), but 3-5 times the space and possibly far greater weight are required compared to gasoline. The extra space required also adds to real or perceived safety concerns. These space and weight penalties also affect the ease of transportation and distribution of, hydrogen, which in turn makes vehicle range concerns still more sensitive. The space and range limits, and associated safety concerns of high pressure hydrogen, represent the largest negatives for conventional hydrogen fueled vehicles. An all hydrogen vehicle based on the approach of Stanford R. Ovshinsky which uses either a fuel cell or a hydrogen burning internal combustion engine (both of which only require low pressure hydrogen fuel), in conjunction with Ovonic Nickel-Metal Hydride batteries has been proven to provide the range and capabilities needed for such a vehicle. The vehicle uses Ovonic solid state metal hydride storage for the hydrogen fuel supply.

Metal hydrides, in the form of metallic particles, which can also be multi-elemental, are used to store hydrogen in many different sizes and shaped containers. In order to facilitate the charging and discharging of the hydrogen, the metal hydride and, consequently, the container, needs to be cooled or heated. To facilitate good performance of the container (desorption rate, filling time, etc.), the inside of the container requires efficient heat exchange means to improve the charging/discharging kinetics.

Repeated absorption and desorption cycles typically result in the decrepitation of the metal hydride particles. Decrepitation occurs when the expansion of chunks or particles of the hydrogen storage alloy expand due to absorption of hydrogen causes greater stress/strain on the chunks beyond the elastic modulus of the alloy and the chunks fracture into smaller pieces. By virtue of the decrepitation, smaller particles of the alloy will settle due to gravity and a localized increase in packing fraction of the metallic particles is observed. Such increase in packing fraction, coupled with high static friction between particles and with particle expansion during absorption, can, in some cases, potentially create localized stresses on the containment vessel in which the alloy is stored. This localized densification has been successfully addressed by ECD Hydrogen Systems Company. The localized densification has been minimized so that it does not limit lifetime or any other vehicle consideration. The present invention provides another means for solving the localized densification problem which also allows for decreasing the weight of the containment system.

Further, some bulk hydrogen storage alloy materials initially absorb much more hydrogen than can be reversibly released (at useful temperatures). A portion of the initially absorbed hydrogen is "trapped" in storage sites which require a large amount of energy to release the stored hydrogen. The added degrees of freedom designed by the approach of the instant invention can release hydrogen sites that are not fully utilized and which do not normally store or release hydrogen at normal temperatures and pressures. Many of these prior art alloys are so called "room temperature" alloys which store and release hydrogen at temperatures between 20° C. and 30° C. Beneficially these alloys can store 2.5 to over 4 wt. % hydrogen. The approach of the present invention permits utilization of those portions of hydrogen storage that have not heretofore been accessible. A multi-functional foam combined with atomic engineering as achieved in our Ovonic Battery patents, which have enabled the present HEV industry can be extended to and utilized in solid state hydrogen storage materials and systems.

The advancement and enhancement of solid state hydrogen storage is the instant invention. Since hydrogen storage materials are adequate with regard to volumetric storage capacity, the object is to reduce weight and also make packaging of the hydrogen fuel more adaptable for the automobile inductry.

SUMMARY OF THE INVENTION

The instant invention comprises a nano-particulate reticulated foam-like structure, which includes particles having a size of 10-200 nanometers. The particles are joined together to form a reticulated foam-like structure. The reticulated foam-like structure being similar to the structure of carbon nano-foam. In one embodiment of the present invention, the nano-particulate reticulated foam-like structure comprises a metal, such as a hydrogen storage alloys. The hydrogen storage alloys may be gas-phase thermal hydrogen storage alloys or electrochemical hydrogen storage alloys.

In another embodiment, the nano-particulate reticulated foam-like structure may comprise a hydroxide, such as nickel hydroxide or manganese hydroxide. In still another embodiment, the nano-particulate reticulated foam-like structure may comprise an oxide, such as a silver oxide or a copper oxide. In a further embodiment, the particles of the nano-particulate reticulated foam-like structure may be formed of a first material and then coated with a second material. Also, the coated nano-particulate reticulated foam-like structure may have a further, second, layer of nano-particulate reticulated foam-like structure deposited onto the coated first layer, and then itself coated with the second material. Using this approach a layered composite material can be formed which includes multiple layers of foam/coating as thick as desired and including as many layers as desired.

Another aspect of the instant invention is a hydrogen storage material which comprises a nano-particulate reticulated foam-like structure including particles of a hydrogen storage alloy having a size of 10-200 nanometers which are joined together to form the reticulated foam-like structure. The nano-particulate reticulated foam-like structure has the ability to improve the hydrogen cycling decrepitation when nano particles are utilized. The hydrogen storage alloy may be a gas-phase thermal hydrogen storage alloy or an electrochemical hydrogen storage alloy.

Yet a further aspect of the instant invention is hydrogen storage material which comprises a nano-particulate reticulated foam-like structure including particles of a hydrogen storage alloy having a size of 10-200 nanometers which are joined together to form the reticulated foam-like structure. The nano-particulate reticulated foam-like structure increases the reversible storage capacity of the material by reducing the irreversible portion of the storage capacity. The reduction may be at least 10% as compared to the same alloy in bulk form. Preferably the reduction may be at least 20%, more preferably at least 25%, and most preferably at least 30% as compared to the same alloy in bulk form. The hydrogen storage alloy may be a gas-phase thermal hydrogen storage alloy.

DETAILED DESCRIPTION OF THE INVENTION

DETAILED DESCRIPTION OF THE INVENTION

The instant invention includes nano-scale particles of material. More particularly nano-scale particles of useful materials such as hydrogen storage alloys. The nano-scale particles of hydrogen storage material are truly nano-scale particles. They are not what is commonly referred to as nano-structure materials. Nano-structure materials are materials having particle sizes no smaller than about a micron or so, which exhibit internal structures (i.e. crystallites or grains) on a nano-scale. The present inventive materials include particles of material in which the individual particles are on the nano-scale. The particles are on the scale of 10-200 nanometers. Thus, the invention includes nano-particulate materials not nano-scale bulk materials.

However, the present invention does not include only the individual nano-scale particles and powders formed therefrom, but further includes a reticulated foam-like structure that is formed by deposition of these particles during production thereof. This structure is similar to that of carbon nanofoams which are known in the art. The particles are interconnected with each other in a three dimensional latticework structure. This latticework is highly porous and has a fractal nature.

Figure 1:
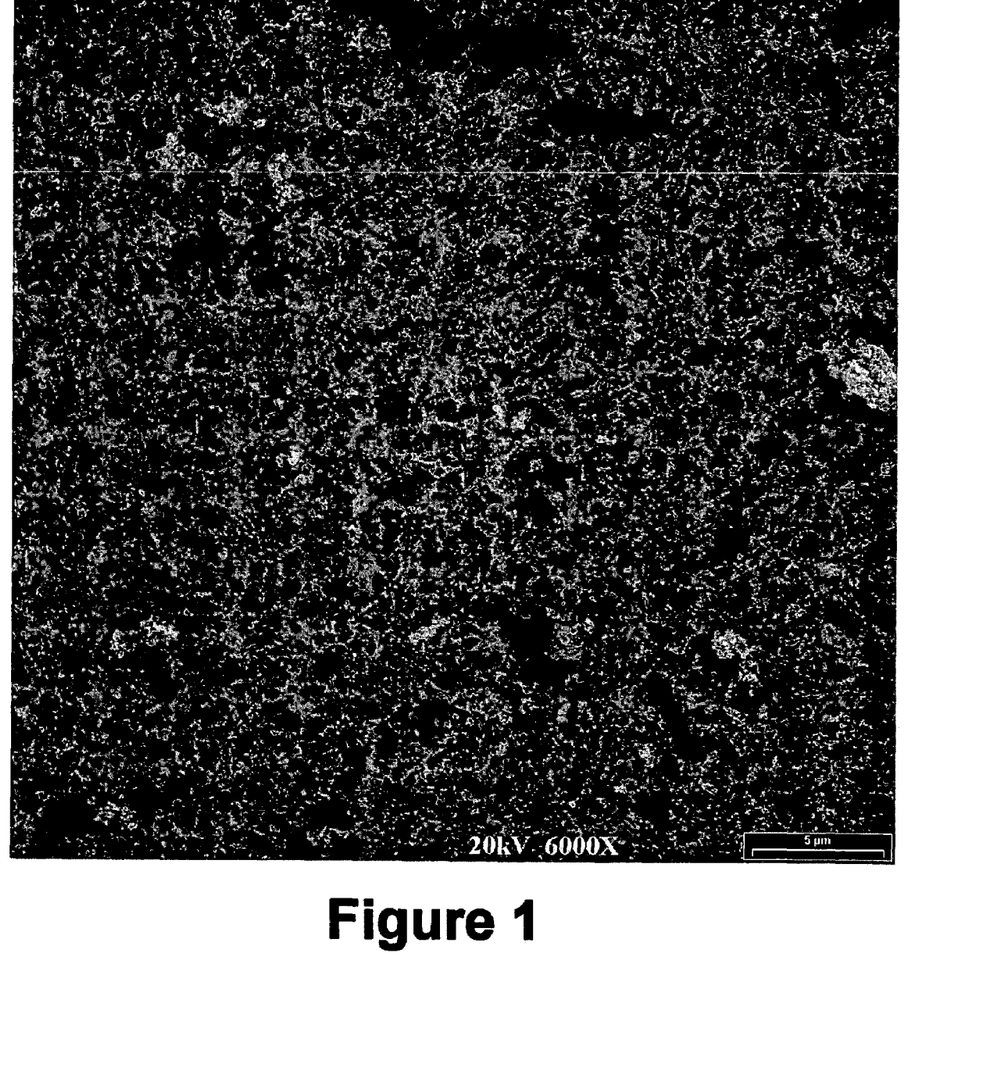
FIG. 1 is an SEM photomicrograph at 6,000 times magnification of an example of the reticulated foam-like structure of the material of the present invention.

FIG. 1 shows an SEM photomicrograph at 6,000 times magnification of an example of the reticulated foam-like structure of the material of the present invention. As can be seen, the material is highly porous and formed from individual nano-scale particles.

Figure 2:
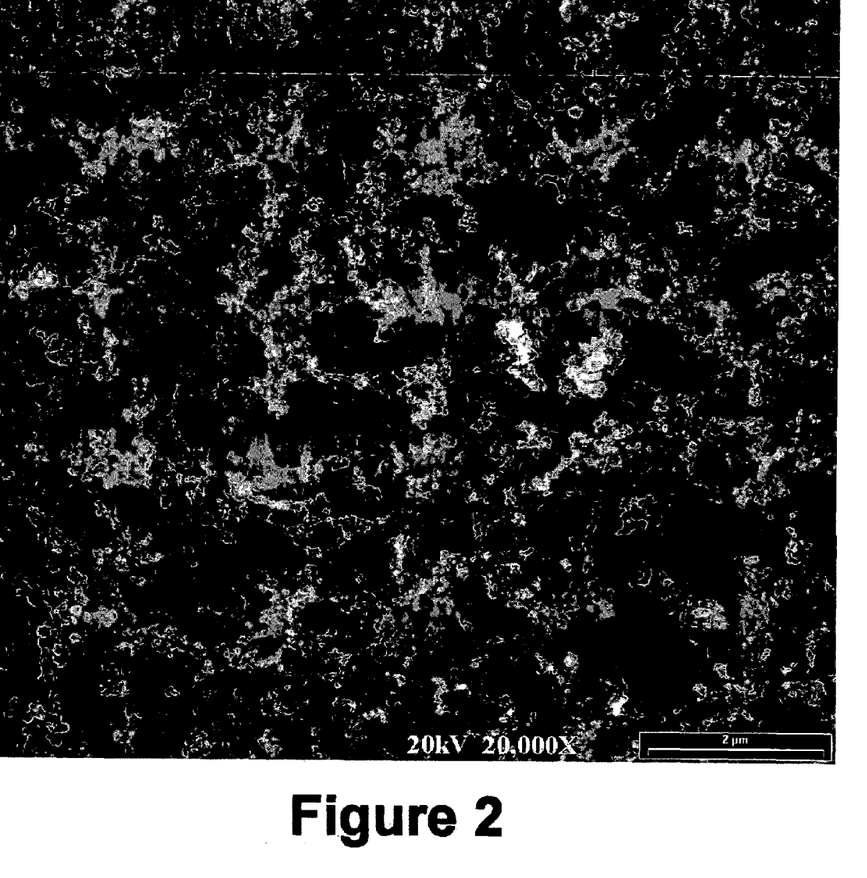
FIG. 2 is an SEM photomicrograph at 20,000 times magnification of the material of FIG. 1.
Figure 3:
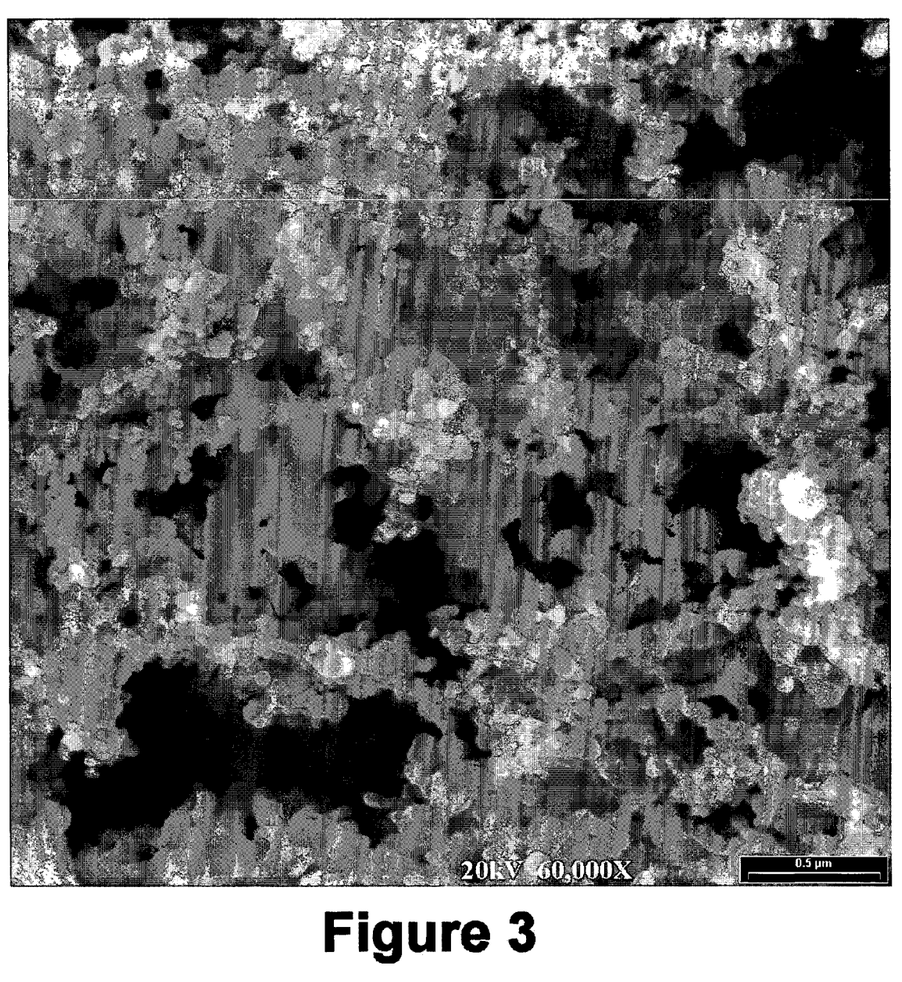
FIG. 3 is an SEM photomicrograph at 40,000 times magnification of the material of FIGS. 1 and 2.
Figure 4:
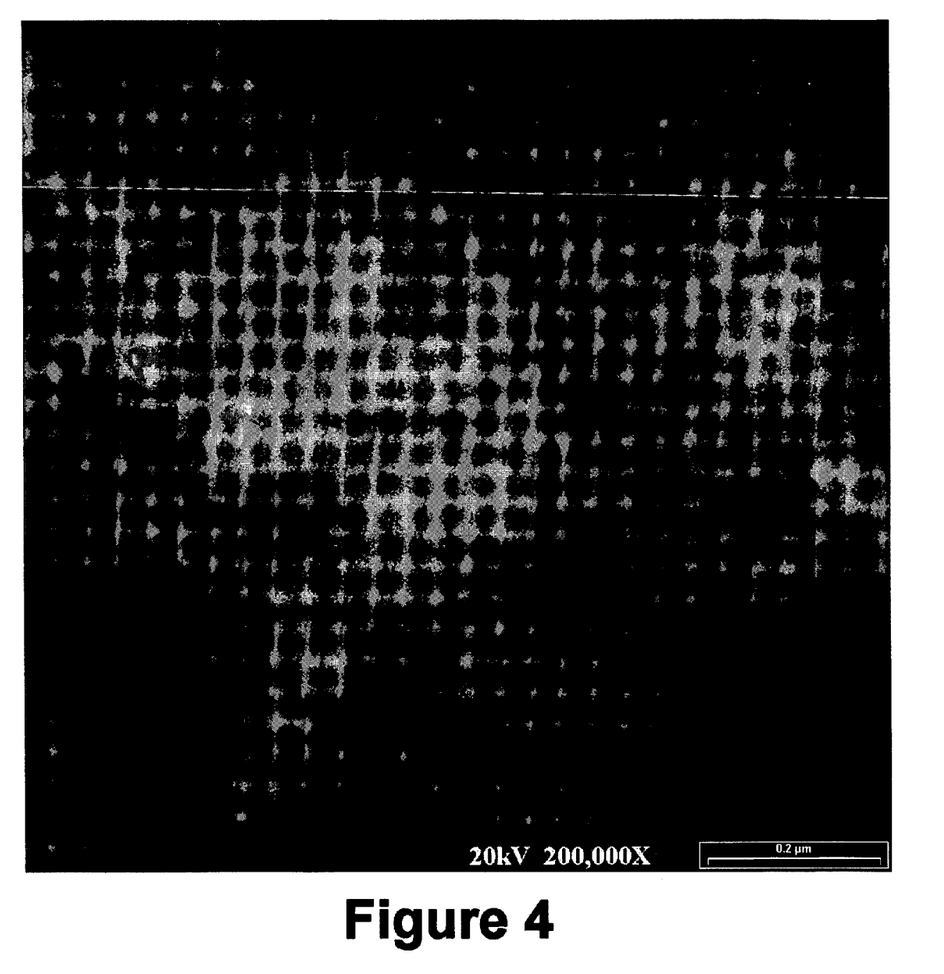
FIG. 4 is an SEM photomicrograph at 200,000 times magnification of the material of FIGS. 1, 2 and 3.

FIG. 2 is an SEM photomicrograph at 20,000 times magnification of the material of FIG. 1. At this magnification, the reticulated foam-like structure is readily apparent as is the nano-scale particulate that forms the structure. FIG. 3 is an SEM photomicrograph at 40,000 times magnification of the material of FIGS. 1 and 2. At this magnification, the particulate nature of the foam is clear and the fractal nature of the reticulated foam-like structure can be seen. Finally, FIG. 4 is an SEM photomicrograph at 200,000 times magnification of the material of FIGS. 1, 2 and 3. Here, it is clear that the individual particles making up the reticulated foam-like structure are nano-scale in size, being anywhere from about 10-200 nanometers and more particularly averaging 10-50 nanometers.

The physical structure of the material of the present invention allows for some very unique mechanical, structural, and topological properties. Because of the open, porous nature of the material, and the nano-scale particle size, which is below the strain/tensile limit, it does not suffer from the usual decrepitation. Thus, the material does not break and fracture on charge/discharge cycling hydrogen. The structure is flexible and can be compressed without breaking. Thus the material does not have the conventional level of localized densification and will allow reduced restrictions on the containment vessel in which the hydrogen storage materia is placed. This allows for a greater flexibility in the shape and materials for such a containment vessel. Thus light weight materials of construction such as aluminum, magnesium, and polymers may be used to create the containment vessel. This will also allow for differently shaped containment vessels. The relaxation on materials of construction will allow for reduced system weight and thus improved overall system gravimetric storage capacity. Further the freedom to used non-conventionally shaped containers makes integration of the storage vessel easier. For example, when integrating the storage vessel into a vehicle, instead of a rigid cylindrical or spherical storage container, containers may be shaped and molded to fit into any available spaces within the vehicle. This in turn provides for the ability to use more storage alloy for increased vehicle range, or provide additional cargo or passenger space, and the bulky tanks of the prior art are not needed. Thus, undergoing expansion and contraction during cycling, the hydrogen storage materials share the expansion over a large volume, and the materials may be substantially immune to decrepitation. This makes higher packing densities possible and minimizes detrimental local pressure on the storage containers.

It should also be noted that the material is, as stated above a porous foam-like reticulated network, which is fractal in nature. Thus the structure of the present invention is not a loose congregation of powder particles, but has a foam-like macrostructure. This fractal nature allows each chunk of the foam to be very similar in most respects to other chunks of the foam as it is broken up by mechanical means. The foam-like nature of the material in combination with the nano-scale size of the particles that make up the foam allows for stress relief during the expansion and contraction that occurs on hydrogen absorption/desorption cycling. Most typical bulk materials would crack up in to smaller and smaller particles, thus allowing for unwanted localized densification.

In addition to the mechanical improvements possessed by the structure of the material of the present invention, there are some advantageous chemical effects as well. A first very useful chemical effect is the greatly increased hydrogen storage kinetics. These materials store hydrogen at an incredible rate because of the enormous surface area of the foam and the constituent nano-scale particulate that forms the foam. Further the materials of the instant invention show a reversible storage capacity beyond the limit of the starting alloy. That is, some bulk hydrogen storage alloy materials initially absorb much more hydrogen than can be reversibly released (at useful temperatures). A portion of the initially absorbed hydrogen is "trapped" in storage sites which require a large amount of energy to release the stored hydrogen. It would be advantageous to be able to desorb some or all of the "trapped" hydrogen storage without resorting to changing temperatures and pressures. This is exactly what the materials of the present invention are capable of doing.

Figure 5:
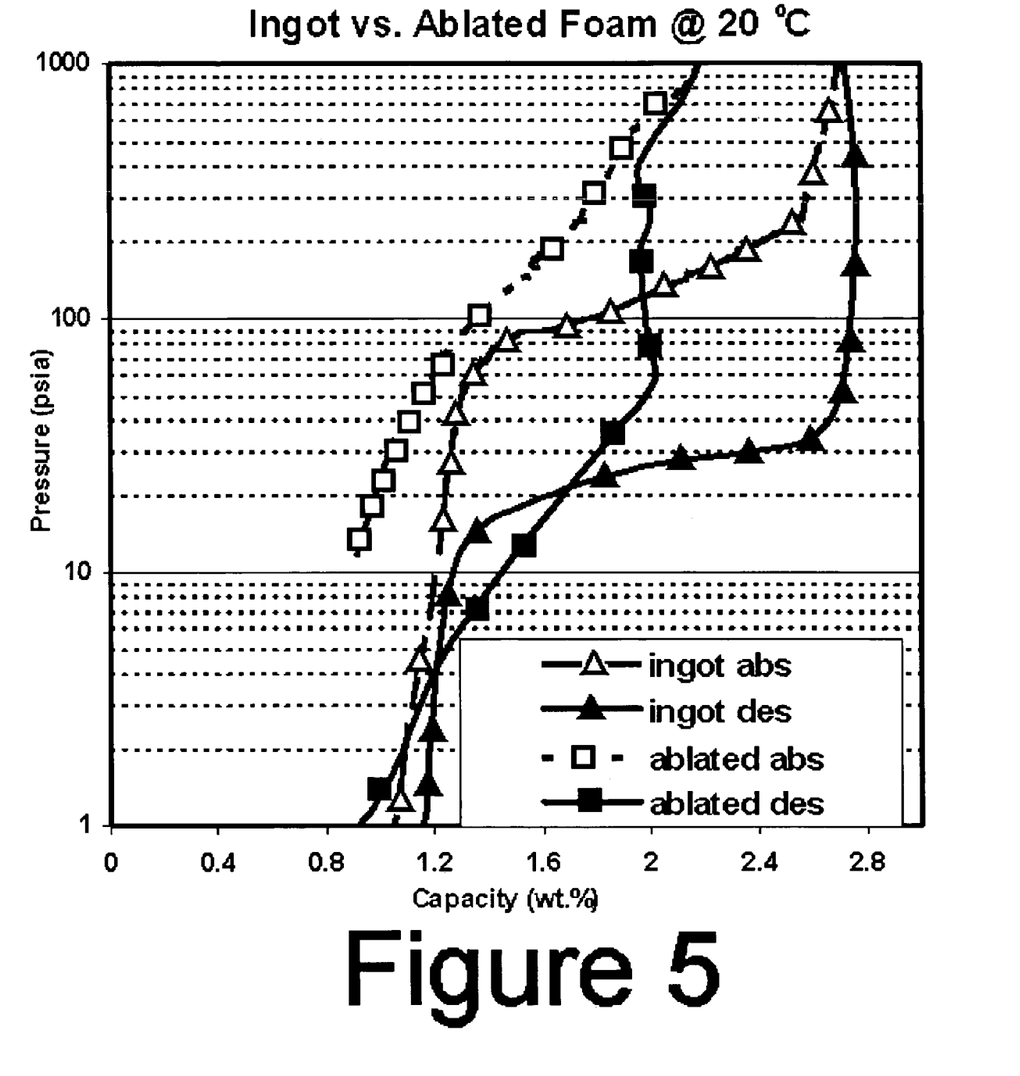
FIG. 5 is a PCT curve of a hydrogen storage alloy nano-scale particulate having the reticulated foam-like structure of the instant invention.

FIG. 5 shows a PCT curve of a hydrogen storage alloy having a nominal composition of Ti 14 at. %, V 58.5 at. %, Cr 3.5 at. %, and Mn 4 at. % in both the bulk form and in the nano-scale particulate, reticulated foam-like structure of the present invention. The material of the present invention desorbs hydrogen down to 0.837 wt. % at 20° C., while the bulk form of the same alloy desorbs only down to about 1.145 wt. % at 20° C. Thus the nano-scale particulate foam of the present invention has increased the reversible storage capacity of the by modifying the sites of the "trapped" hydrogen to make the energy requirements for release much lower thereby decreasing the "trapped" hydrogen in the alloy by about 26.9%.

The nano-scale particulate, reticulated foam-like structure of the present invention decreases the "trapped" hydrogen in the alloy by at least 10%. Preferably the material of the present invention decreases the "trapped" hydrogen in the alloy by at least 20%, more. preferably by at least 25% and most preferably by at least 30%. The present inventors also note that the total absorption capacity of the material of the present example has been reduced, due to oxygen contamination. Many of the sites for hydrogen storage are bound by the oxygen contamination, much as the nesting sites (hydrogen storage sites) in many other birds nests (hydrogen storage alloys) are taken up by the eggs (oxygen) of for example the Cuckoo bird. Upon elimination of the oxygen contamination, the materials of the present invention will have at least the same, if not greater, total hydrogen storage capacity as the same alloy in ingot or crushed bulk form. Furthermore, the instant inventors believe with the increased reversible storage capacity of the materials of the instant invention, the weight savings for hydrogen storage materials in a vehicle may be as high as 30%.

EXAMPLE

Figure 6:
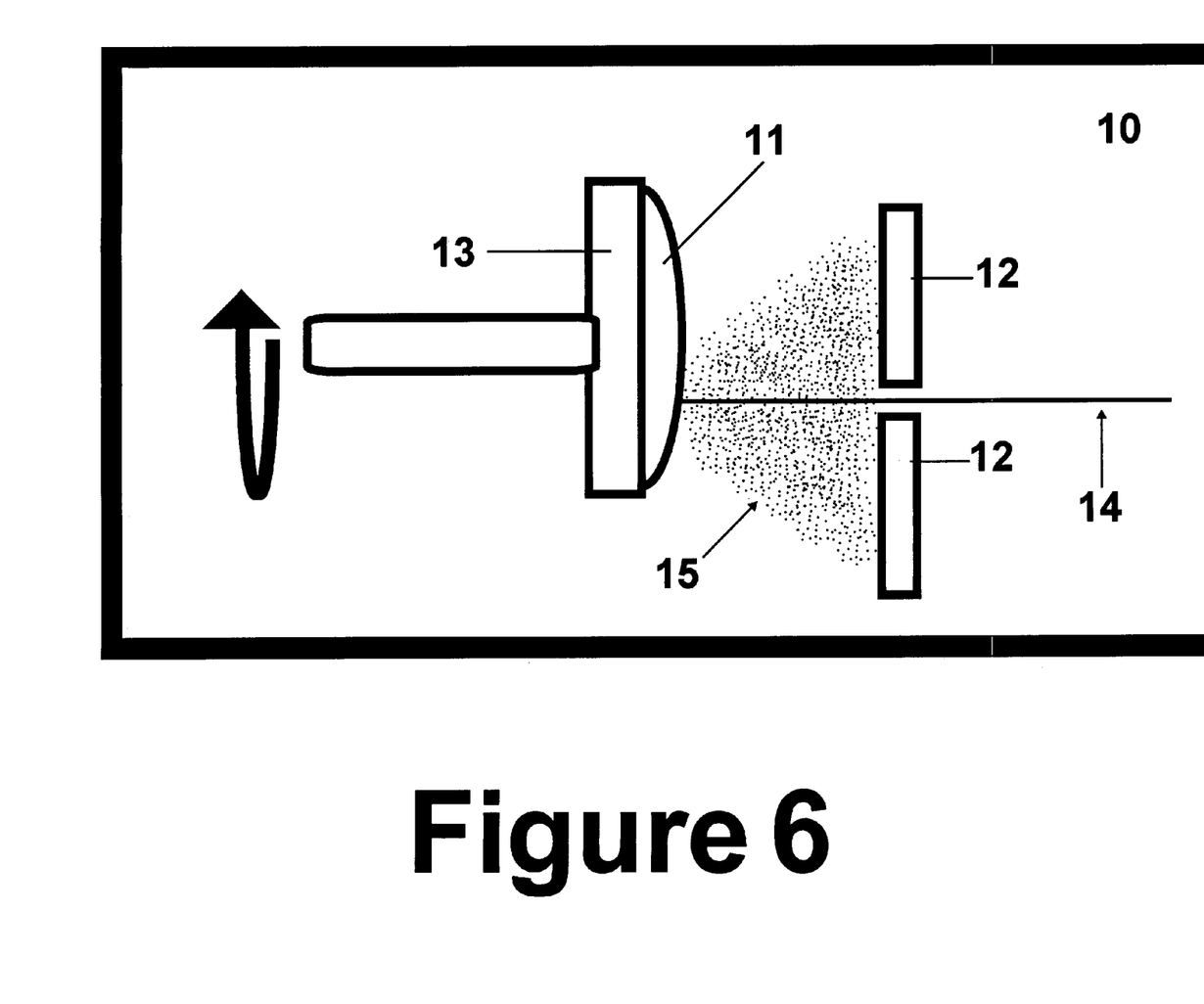
FIG. 6 is a simplified example of an apparatus for the laser ablation deposition of the inventive material.

One method of forming nano-particulate reticulated foam-like structure of the present invention is by laser ablation from a target made of the desired alloy. FIG. 6 is a simplified example of an apparatus for the laser ablation deposition of the inventive material. Inside a deposition chamber 10 is a target 11 of material to be ablated. The ablated target material is collected on deposition substrate 12. The target 11 is mounted on a target holder 13, which preferable is designed to rotate the target. A laser beam 14 is directed so as to impinge on the target 11. The energy imparted to the target ablates material from the target and forms a plume of ablated material 15, which is directed toward and collected on deposition substrate 12.

The deposition chamber 10 is initially evacuated to a pressure of $1.0 \times 10^{-6}$ Torr. Then the chamber is filled with an inert gas such as argon to a pressure of 1-3 Torr. The laser used by the present inventors is an eximer laser, however other lasers may be used. The laser beam power pulses are about 250-500 mJ and the pulse frequency is 50-200 Hz, with a pulse duration of 12-20 nanoseconds. The energy is directed toward the target 11 and a plume of ablated material 15 is directed toward and collected the substrate 12. The material is subsequently removed from the substrate, collected and tested. It should be noted that the chamber is not left in a high vacuum state during deposition. The reason for this is that in a high vacuum, the ablated materials would deposit as a uniform film. To get the structure of the present invention, a relatively high pressure non-reactive atmosphere is required. This results in a lower mean free path (i.e. distance between collision with gas molecules or other particles) which allows for particles to grow to nano-scale size before they deposit on the substrate.

The methods and structure of the present invention is useful for hydrogen storage materials for battery electrodes, fuel cell electrodes and gas phase storage of hydrogen. The method can use for example transition metal hydrogen storage alloys, alkaline earth hydrogen storage alloys, rare earth hydrogen storage alloys, mixtures of such alloys, or other hydrogen storage materials. The alloys may have structure types including AB, $AB_2$, $A2_B$, $AB_5$, $A_2B_7$, $C_{14}$, $C_{15}$, Laves, FCC, BCC, Hexagonal, etc. The structure can be formed from a pre-alloyed material or virtual alloys can be made by mixing individual foam-like structures made from single elements. Additionally, the virtual alloy may be made my mixing pre-alloyed foams with single element foams or mixing pre-alloyed foams with other pre-alloyed foams.

A hydrogen storage material for use in a battery or fuel cell may be chosen from the Ti—V—Zr—Ni active materials such as those disclosed in U.S. Pat. No. 4,551,400 ("the '400 patent"), the disclosure of which is incorporated by reference. As discussed above, the materials used in the '400 patent utilize a Ti—V—Ni composition, where at least Ti, V, and Ni are present with at least one or more of Cr, Zr, and Al. The materials of the '400 patent are multi-phase materials, which may contain, but are not limited to, one or more phases with C14 and C15 type crystal structures.

There are other Ti—V—Zr—Ni battery or fuel cell alloys which may also be used for the hydrogen storage material of negative electrodes. One family of materials are those described in U.S. Pat. No. 4,728,586 ("the '586 patent"), the disclosure of which is incorporated by reference. The '586 patent discloses Ti—V—Ni—Zr alloys comprising T, V, Zr, Ni, and a fifth component, Cr. The '586 patent mentions the possibility of additives and modifiers beyond the T, V, Zr, Ni, and Cr components of the alloys, and discusses other additives and modifiers, the amounts and interactions of the modifiers, and the particular benefits that could be expected from them.

In addition to the materials described above, hydrogen storage materials for the negative electrode of a NiMH battery may also be chosen from the disordered metal hydride alloy materials that are described in detail in U.S. Pat. No. 5,277,999 ("the '999 patent"), to Ovshinsky and Fetcenko, the disclosure of which is incorporated herein by reference.

Examples of Mg—Ni based battery alloys are disclosed in U.S. Pat. Nos. 5,616,432 and 5,506,069, the disclosures of which is incorporated herein by reference. These patents disclose, electrochemical hydrogen storage materials comprising:

(Base Alloy)$_a$ M$_b$, where, Base Alloy is an alloy of Mg and Ni in a ratio of from about 1:2 to about 2:1, preferably 1:1; M represents at least one modifier element chosen from the group consisting of Co, Mn, Al, Fe, Cu, Mo, W, Cr, V, Ti, Zr, Sn, Th, Si, Zn, Li, Cd, Na, Pb, La, Mm, and Ca; b is greater than 0.5, preferably 2.5, atomic percent and less than 30 atomic percent; and a+b=100 atomic percent. Preferably, the at least one modifier is chosen from the group consisting of Co, Mn, Al, Fe, and Cu and the total mass of the at least one modifier element is less than 25 atomic percent of the final composition. Most preferably, the total mass of said at least one modifier element is less than 20 atomic percent of the final composition.

An example of a Ca—Ni based battery alloy is disclosed in U.S. Pat. No. 6,524,745 the disclosure of which is incorporated herein by reference. This patent discloses electrochemically stabilized Ca—Ni hydrogen storage alloy material for use as the active negative electrode material of an alkaline electrochemical cell. The alloy material includes at least one modifier element which stabilizes the alloy material from degradation during electrochemical cycling in an alkaline cell, by protecting calcium within the alloy and preventing dissolution of calcium into the alkaline electrolyte. The alloy has the formula $(Ca_{1-x-y}M_xNi_{2y})Ni_{5-z}Q_z$, where M is at least one element selected from the group consisting of misch metal, rare earth metals, zirconium and mixtures of Zr with Ti or V, Q is at least one element selected form the group consisting of Si, Al, Ge, Sn, In, Cu, Zn, Co, and mixtures thereof, x ranges between about 0.02 and 0.2, y ranges between about 0.02 and 0.4, and z ranges from about 0.05 to about 1.00.

One useful thermal hydrogen storage alloy system is described in U.S. Pat. No. 6,746,645, the disclosure of which is hereby incorporated by reference. This patent describes alloys which contain, greater than about 90 weight % magnesium and have 1) a thermal hydrogen storage capacity of at least 6 weight %; 2) thermal absorption kinetics such that the alloy powder absorbs 80% of it's total capacity within 10 minutes at 300.degree. C.; and 3) a gas phase cycle life of at least 500 cycles without loss of capacity or kinetics. Modifier elements added to the magnesium to produce the alloys mainly include Ni and Mm (misch metal) and can also include additional elements such as Al, Y and Si. Thus the alloys will typically contain 0.5-2.5 weight % nickel and about 1.0-4.0 weight % Mm (predominantly contains Ce and La and Pr). The alloy may also contain one or more of 3-7 weight % Al, 0.1-1.5 weight % Y and 0.3-1.5 weight % silicon.

Another type of gas phase alloy useful for the instant invention is disclosed in U.S. Pat. Nos. 6,737,194 and 6,517,970 the disclosures of which are hereby incorporated by reference. Generally the alloys comprise titanium, zirconium, vanadium, chromium, and manganese. The alloy may preferably further comprise iron and aluminum and may also contain 1-10 at. % total of at least one element selected from the group consisting of Ba, Co, Cu, Cs, K, Li, Mm, Mo, Na, Nb, Ni, Rb, Ta, Tl, and W (where Mm is misch metal, a mixture of rare earth elements). Specifically the low temperature hydrogen storage alloy comprises 0.5-10 at. % Zr, 29-35 at. % Ti, 10-15 at. % V, 13-20 at. % Cr, 32-38 at. % Mn, 1.5-3.0 at. % Fe, and 0.05-0.5 at. % Al. The alloy remains non-pyrophoric upon exposure to ambient atmosphere even after 400 hydrogen charge/discharge cycles, and preferably even after 1100 hydrogen charge/discharge cycles. The alloy has a gas phase thermal hydrogen storage capacity of at least 1.5 weight percent, more preferably at least 1.8 weight percent, and most preferably at least 1.9 weight percent.

Yet another gas phase hydrogen storage alloy that would be useful in the instant invention is described in U.S. Pat. No. 6,726,783, the disclosure of which is hereby incorporated by reference. Disclosed therein is a magnesium-based hydrogen storage alloy powder. The alloy has a high hydrogen storage capacity, fast gas phase hydrogen adsorption kinetics and a long cycle life. The alloy is characterized in that it has an intergranular phase which prevents sintering of the alloy particles during high temperature hydriding/dehydriding thereof, thus allowing for a long cycle life. The magnesium-based hydrogen storage alloy powder comprises at least 90 weight % magnesium, and has: a) a hydrogen storage capacity of at least 6 weight % (preferably at least 6.9 wt %); b) absorption kinetics such that the alloy powder absorbs 80% of it's total capacity within 5 minutes at 300° C. (preferably within 1.5 minutes); and c) a particle size-range of between 30 and 70 microns. The alloy also includes Ni and Mm (misch metal) and can also include additional elements such as Al, Y, B, C and Si. Thus the alloys will typically contain 0.5-2.5 weight % nickel and about 1.0-5.5 weight % Mm (predominantly contains Ce, La, Pr and Nd). The alloy may also contain one or more of: 3-7 weight % Al; 0.1-1.5 weight % Y; 0.1-3.0 weight % B; 0.1-3.0 weight % C; and 0.3-2.5 weight % silicon. The alloy is preferably produced via atomization (such as inert gas atomization), a rapid solidification process in which the quench rate is controlled to be between $10^3$-$10^{4o}$ C./s.

A further gas phase hydrogen storage alloy which is useful in the instant invention is described in U.S. Pat. No. 6,536,487, the disclosure of which is incorporated herein by reference. The alloys are atomically engineered hydrogen storage alloys having extended storage capacity at high pressures and high pressure hydrogen storage units containing variable amounts thereof. Specifically the hydrogen storage alloy is an alloy is an $AB_2$ alloy, such as a modified Ti—$Mn_2$ alloy comprising, in atomic percent 2-5% Zr, 26-33% Ti, 7-13% V, 8-20% Cr, 36-42% Mn; and at least one element selected from the group consisting of 1-6% Ni, 2-6% Fe and 0.1-2% Al. The alloy may further contain up to 1 atomic percent Misch metal. Examples of such alloys include in atomic percent: 1) 3.63% Zr, 29.8% Ti, 8.82% V, 9.85% Cr, 39.5% Mn, 2.0% Ni, 5.0% Fe, 1.0% Al, and 0.4% Misch metal; 2) 3.6% Zr, 29.0% Ti, 8.9% V, 10.1% Cr, 40.1% Mn, 2.0% Ni, 5.1% Fe, and 1.2% Al; 3) 3.6% Zr, 28.3% Ti, 8.8% V, 10.0% Cr, 40.7% Mn, 1.9% Ni, 5.1% Fe, and 1.6% Al; and 4) 1% Zr, 33% Ti, 12.54% V, 15% Cr, 36% Mn, 2.25% Fe, and 0.21% Al.

Still another gas phase alloy is disclosed in U.S. Pat. Nos. 6,491,866 and 6,193,929, the disclosures of which is herein incorporated by reference. The alloy contains greater than about 90 weight % magnesium and has a) a hydrogen storage capacity of at least 6 weight %; b) absorption kinetics such that the alloy powder absorbs 80% of it's total capacity within 10 minutes at 300° C.; c) a cycle life of at least 500 cycles without loss of capacity or kinetics. Modifier elements added to the magnesium to produce the alloys mainly include Ni and Mm (misch metal) and can also include additional elements such as Al, Y and Si. Thus the alloys will typically contain 0.5-2.5 weight % nickel and about 1.0-4.0 weight % Mm (predominantly contains Ce and La and Pr). The alloy may also contain one or more of 3-7 weight % Al, 0.1-1.5 weight % Y and 0.3-1.5 weight % silicon.

One final example of a useful magnesium based alloy is described in U.S. Pat. No. 6,328,821, the disclosure of which is herein incorporated by reference. The alloys. have comparable bond energies and plateau pressures to $Mg_2Ni$ alloys, while reducing the amount of incorporated nickel by 25-30 atomic %. This reduced nickel content greatly reduces cost of the alloy. Also, while the kinetics of the alloy are improved over pure Mg, the storage capacity of the alloy is significantly greater than the 3.6 wt. % of $Mg_2Ni$ material. In general the alloys contain greater than about 85 atomic percent magnesium, about 2-8 atomic percent nickel, about 0.5-5 atomic percent aluminum and about 2-7 atomic percent rare earth metals, and mixtures of rare earth metals with calcium. The rare earth elements may be Misch metal and may predominantly contain Ce and La. The alloy may also contain about 0.5-5 atomic percent silicon.

It should be noted that the nano-particulate reticulated foam-like structure of the present invention has exceptionally superior catalytic capabilities. This is because of the tremendous surface area of the nano-particulate which forms the foam. This makes the materials useful as catalysts as well as materials for hydrogen storage, battery and fuel cell electrodes, etc. The instant methods and structure would also be useful on other materials, such as hydroxides and oxides for use in positive-electrodes of batteries and oxygen electrodes of fuel cells as well as catalytic materials of any sort. Examples of hydroxides include nickel hydroxide and manganese hydroxide. Examples of oxides include silver oxides and copper oxides.

Further, the present reticulated foam-like structure could be formed from a base material and other useful materials may then be coated onto and into the pores thereof. For example, the base reticulated foam-like structure may be formed from an electrically conductive material such as nickel, copper, aluminum, or carbon, and another material such as a hydrogen storage alloy or a hydroxide may be deposited onto the. base. This composite material would be useful in battery and fuel cell electrodes. Further, a multi-layered structure can be formed by depositing an additional layer of base reticulated foam-like structure and optionally another coating, ad infinitum as desired. The layers of nano-particulate reticulated foam-like structure and coatings may be the same throughout the structure or may be different as needed for the desired layered structure.

While the instant invention uses laser ablation to form the nano-particulate reticulated foam-like structure, the inventors realize that this experimental technique will not readily be converted to a mass scale production technique. Other techniques which presently can be used to make non-foam-like structures may be adapted to form foams by modifying the apparatuses and methods of use. Such techniques as chemical vapor deposition (CVD), physical vapor deposition (PVD), physical vapor synthesis (PVS), reactive sputtering, electrodeposition, laser pyrolysis, laser ablation, spray conversion, mechanical alloying, and sol gel techniques, alone or in combinations may be used. New, lower cost production methods are evolving from these and similar techniques. In general, materials can be synthesized from atomic or molecular precursors or by chemical or physical means.

We claim:
1. A material comprising:
a nano-particulate reticulated foam-like structure, said structure including particles having a size of 10-200 nanometers, said particles joined together to form a reticulated foam-like structure, said reticulated foam-like structure being similar to the structure of carbon nano-foam; wherein said nano-particulate reticulated foam-like structure comprises a hydroxide.

2. The material of claim 1, wherein said hydroxide is selected from the group consisting of nickel hydroxide and manganese hydroxide.

3. A material comprising:
a nano-particulate reticulated barn-like structure, said structure including particles having a size of 10-200 nanometers, said particles joined together to form a reticulated foam-like structure, said reticulated foam-like structure being similar to the structure of carbon nano-foam; wherein said nano-particulate reticulated foam-like structure comprises an oxide selected from the group consisting of silver oxides and copper oxides.

* * * * *